B. LEIN.
POTATO PLANTING ATTACHMENT.
APPLICATION FILED JAN. 15, 1914.
1,167,907.
Patented Jan. 11, 1916.
3 SHEETS—SHEET 1.
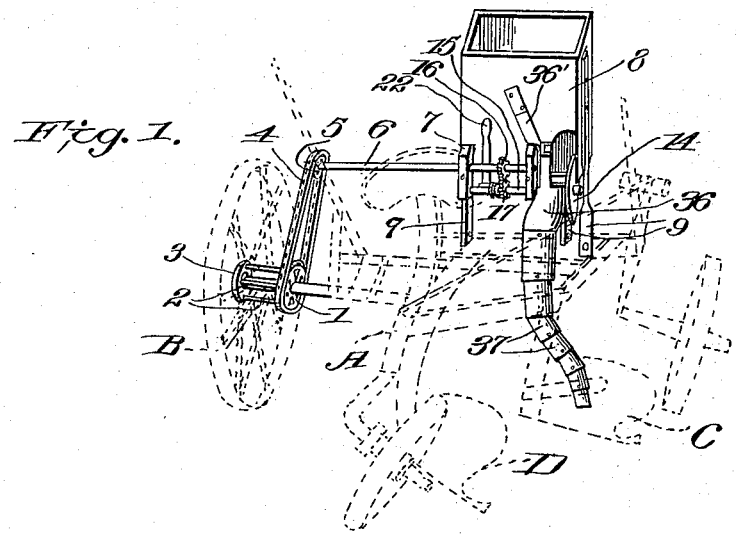
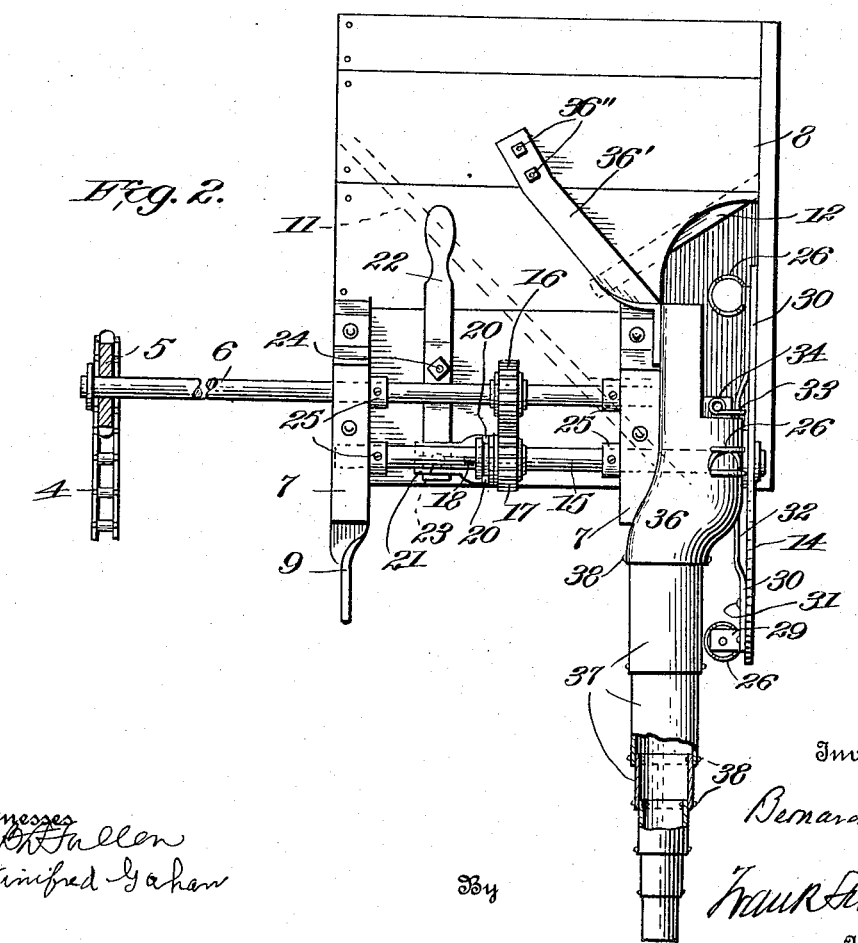

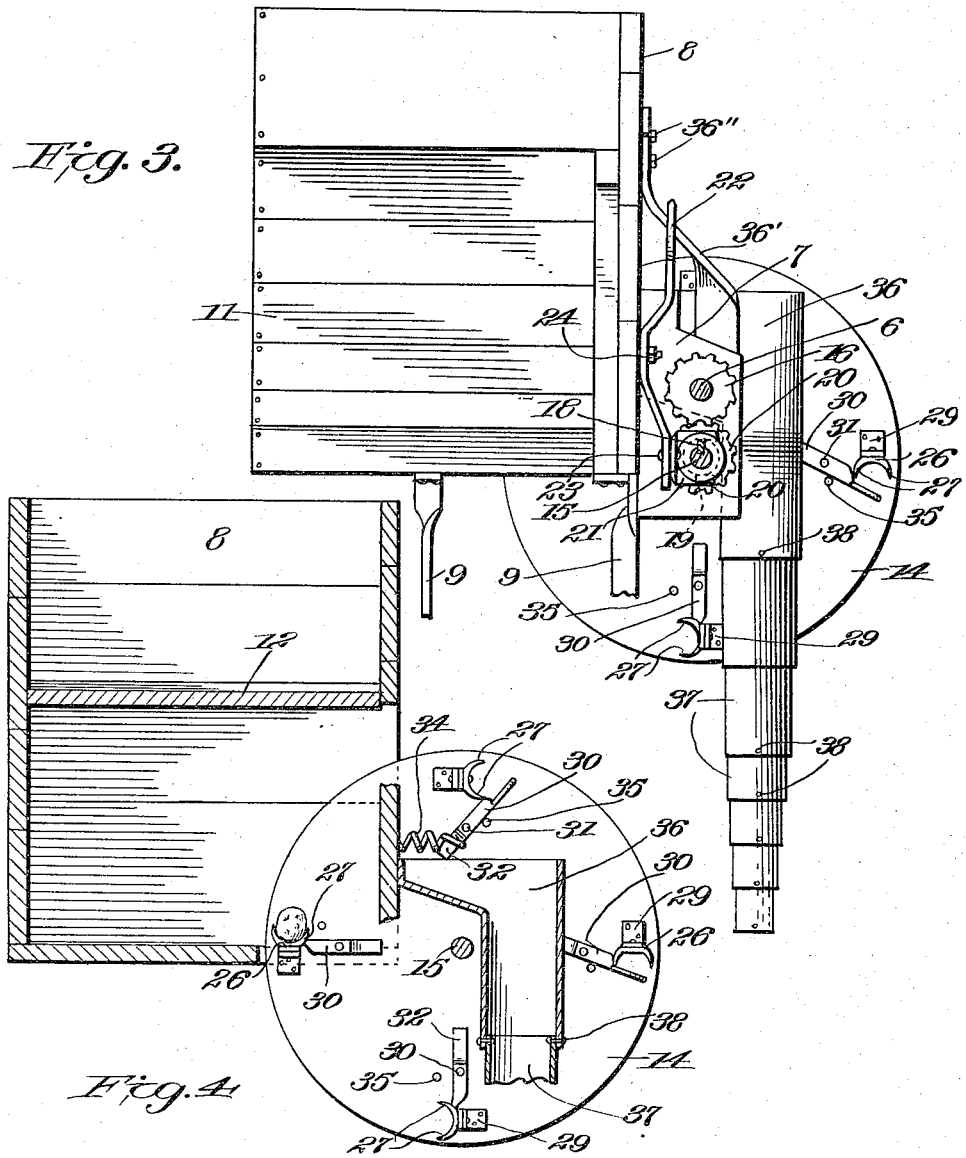

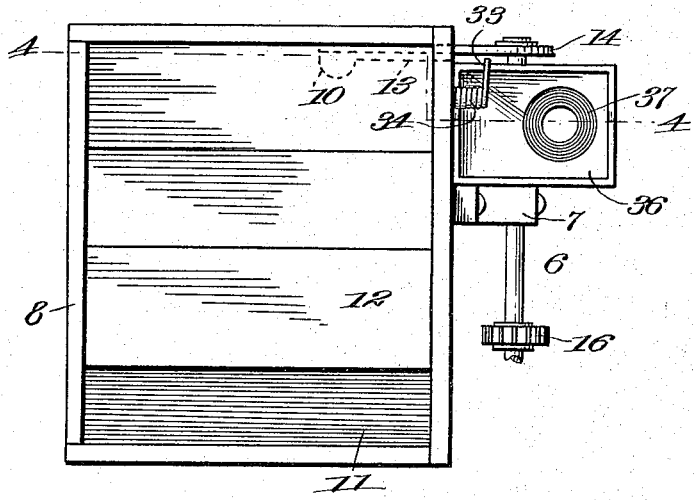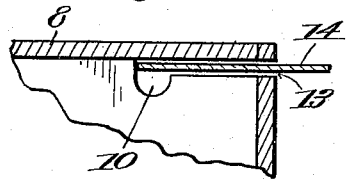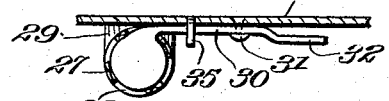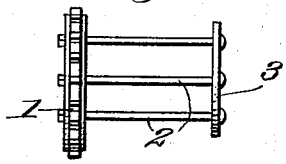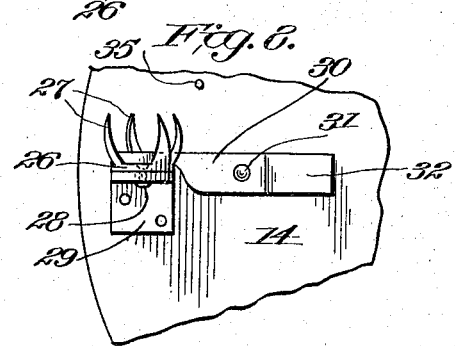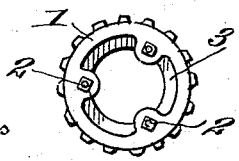

UNITED STATES PATENT OFFICE.

BERNARD LEIN, OF POWERS LAKE, NORTH DAKOTA.

POTATO-PLANTING ATTACHMENT.

1,167,907. Specification of Letters Patent. Patented Jan. 11, 1916.

Application filed January 15, 1914. Serial No. 812,332.

*To all whom it may concern:*

Be it known that I, BERNARD LEIN, a citizen of the United States, residing at Powers Lake, in the county of Ward and State of North Dakota, have invented certain new and useful Improvements in Potato-Planting Attachments, of which the following is a specification.

My invention relates to planters and more particularly to a potato planter such as may be auxiliary to and form an attachment for a farming implement such as a riding plow, gang or sulky plow.

Among the objects of the invention are the provision of a device of this kind, that is of generally improved construction whereby the planter may prove more efficient in use, and the provision of one that employs few and simple parts so that it may be constructed at moderate cost.

One embodiment of the invention is hereinafter described and illustrated in the accompanying drawings, wherein:—

Figure 1, is a perspective view showing the application of the planter to a gang plow. Fig. 2, is an elevation of the planter alone. Fig. 3, is a view of the planter partly in elevation and in section taken at right angles to Fig. 2. Fig. 4, is a section view on line 4—4 of Fig. 5. Fig. 5, is a plan or top view of the planter. Fig. 6, is a detail illustrating part of the bottom of the hopper and planter disk or member. Fig. 7, is a detail cross section, through part of the planter member, illustrating one of the conveyer devices employed. Fig. 8, is a view of the part of Fig. 7, but taken at right angle thereto: and Figs. 9, and 10, are respectively side and end views of the sprocket wheel and connecting means for the drive shaft of the implement.

Like reference characters designate like or corresponding parts wherever they occur through the various views of the drawings.

The planter, such as will presently be specifically described, forms an attachment for any suitable farming implement, for instance the riding gang plow shown in Fig. 1, and generally designated A. The power for operating the planter is derived through the rotation of a suitable part of the plow upon travel thereof, such as from the wheel B.

To wheel B is suitably fastened to rotate therewith, a sprocket member 1, as by means of the bolts 2, which pass through the wheel B intermediate the spokes and on the other side of the wheel through a ring of clamp, plate 3. Over sprocket 1 passes a sprocket chain 4, which also pass over a sprocket wheel 5, mounted on a drive shaft 6, mounted in suitable bearings, brackets 7, carried by a hopper or receptacle 8.

The potatoes or seed to be planted are carried in the hopper 8, and the hopper is suitably supported from the plow frame as by means of any desired number of brackets 9. Hopper 8, in its bottom, is provided with an opening 10 in which the potatoes before conveyance to the furrow or hill, rest. The main bottom 11 of the hopper slants toward the opening 10 as shown, to insure the feed of the potatoes thereto. Above the opening 10 a fender board 12 is provided so that the potatoes will not unduly crowd at the opening.

A narrow opening 13, in the bottom of the hopper leads to the opening 10, and in said opening operates a planter member, shown in the form of a disk or plate 14, the plate, being mounted to rotate with a driven shaft 15, mounted in the bearings 7.

The shaft 15, is driven from shaft 6 by means of the intermeshing gear wheels, 16 and 17. At times it is desirous that the planter member remain idle, and for this reason gear wheel 17, is shiftable to disengage the gear wheel 16. This gear wheel is slidably mounted on the shaft 15, and the shaft has a key or rib 18, extending into the same. A collar is formed on gear 17, and has provided thereon a circumferential groove 19, into which arms 20, of a bifurcated shifting member 21 extend. Said shifting member is operated by means of a lever 22, being pivoted thereto at 23 and pivoted to the hopper at 24. Collar 25 on the shafts 6 and 15, prevents longitudinal movement of the shafts.

On the feeder disk member are mounted any desired number of conveyer devices for the potatoes or seed, for instance, four as shown. These devices comprise a holder or receptacle 26 (see Figs. 7 and 8) having fingers 27. Each receptacle of course has a base and through the same passes a rivet, or the like 28, fastening the receptacle to a bracket 29, which in turn is riveted or otherwise fastened to the disk. Upon the base of the receptacle intermediate the fingers, rest the discharge head or plate of a discharge arm 30 which is pivoted to the disk 14 at 31. The arm is bent outwardly at 32, so that it will positively be in the path of a trip or abutment member in the form of a finger 33, of a coil spring 34, fastened to the hopper, see Figs. 2 and 5. Stop pins 35, are employed to limit the movement of the discharge arms for a purpose to be later set forth.

Adjacent the planter member is arranged a suitable discharge chute, which may employ a main or rigid section 36, fastened in position as to the hopper by means of a bracket or arm 36′ either formed integral therewith or separate therefrom, fastened thereto as desired, and bolted or otherwise secured to the hopper as at 36″. A plurality of relatively adjustable or flexing chutes section 37, are pivoted to each other and one to the section 36, by rivets or the equivalent at 38. This construction enables the chute to flex so as to be capable of adjustment to drop or discharge potatoes in a desired furrow or location. Fig. 1, illustrates the chute as thus adjusted.

The operation will now be described with respect to the gang plow illustrated. As the plow is drawn along, the chute is in position so as to extend in the rear of the forward plow member, which may be designated C, for convenience, so as to discharge the potatoes or seed into the furrow opened there by. Thereafter the furrow slice turned by the rear plow member designated D for convenience, will be thrown into the opened furrow and onto the discharged potatoes, thus covering and completing the planting thereof. Before the planter member operates lever 22, is in the position shown in Fig. 2, therefore motion from wheel A is imparted through the sprocket wheel 1 and 5 and chain 4 to shaft 6, the shaft in turn transmitting motion to the shaft 15 and the planter member through the medium of the gear wheels 16 and 17. As the planter member rotates the same receptacles 26 and discharge members 30 pass through the opening 10 and narrow opening 13. Potatoes or seed fall continuously from the inclined bottom 11, and fender 12, to and rest in the opening 10. As the receptacles approach the opening 10, the discharge arms rest on the base of the receptacles and the potato is received in the receptacles between the fingers 27 thereof and may rest upon the head of said arms 30. Upon further rotation of the planter member the receptacles carry or convey the potatoes above the chute and during their conveyance thereto the arms 30, at bent portions 32, engage the trip finger 33, which tilts or moves the arms from the receptacle, this engaging the potatoes and positively removing them from the receptacle and discharging them into the chute from which they fall into the furrow. The finger 33 being part of the spring 34 yields to some extent upon engagement with the arms and thus reduces the shock and chances of injury to the arms 30 and finger upon contact.

Inasmuch as merely the preferred embodiment of the invention has been illustrated and described, changes such as fall within the spirit and scope of the appended claims are reserved.

Having thus described my said invention what I claim as new and desire to secure by Letters Patent is:—

1. In a planter, a supply hopper, a planter member, laterally offset discharge means carried by said member including a receptacle having a plurality of tines and a pivoted discharge member carried by the planter member, said discharge member having a portion normally resting on said receptacle intermediate said tines serving as its bottom and means on which contents thereof rest.

2. In a planter, a supply hopper, a planter member, laterally offset discharge means carried by said member including a bracket fastened to the member and receptacle fastened to the bracket having a plurality of tines, a discharge member pivoted on said planter member, said discharge member having a portion normally resting on said receptacle intermediate said tines and serving as its bottom and means on which contents thereof rest, said pivoted discharge member having an offset portion in combination with a trip means mounted on said hopper and engageable by said offset portion.

3. In a planter, a supply hopper, a first shaft, a second shaft, a planter member turnable with one of said shafts, means to drive the other of said shafts, means to drive one of said shafts from the other of said shafts, said hopper being provided with an opening in its bottom, said opening having an enlargement serving as a rest opening for contents, said planter member being movable through said opening, a discharge chute supported from the hopper, discharge means on the planter member to pass through said enlargement and to empty into said chute, said discharge means including a receptacle and a pivoted discharge member, said pivoted discharge member normally resting on said receptacle and serving as its bottom and means on which contents thereof rest and trip means on said hopper to be engaged by said pivoted discharge member.

In testimony whereof I affix my signature in presence of two witnesses.

BERNARD LEIN.

Witnesses:
A. H. LUNDQUIST,
M. H. LEDENE.